United States Patent [19]

Lowe

[11] 4,159,041
[45] Jun. 26, 1979

[54] ENCODER ASSEMBLY

[76] Inventor: Terry B. Lowe, 38807 Jonquil Dr., Newark, Calif. 94560

[21] Appl. No.: 868,465

[22] Filed: Jan. 10, 1978

[51] Int. Cl.² .................. G01G 21/00; G01G 23/14
[52] U.S. Cl. ................................. 177/128; 177/174
[58] Field of Search .......... 177/128, 174, 223, DIG. 6

[56] References Cited

U.S. PATENT DOCUMENTS

| 3,631,935 | 1/1972 | Seed | 177/223 X |
| 4,072,201 | 2/1978 | Wiesler | 177/DIG. 6 |

FOREIGN PATENT DOCUMENTS 2412760 9/1975 Fed. Rep. of Germany .... 177/DIG. 6
377118 6/1964 Switzerland ..................... 177/DIG. 6

Primary Examiner—George H. Miller, Jr.
Attorney, Agent, or Firm—Flehr, Hohbach, Test, Albritton & Herbert

[57] ABSTRACT

Encoder assembly for use with a dial type scale. The assembly includes a base, a bearing mounted on the base which is mounted in the scale in place of one of the bearings for the indicator shaft, and a pinion and shaft which replace the pinion and shaft of the scale. An encoder disc is mounted on the shaft, and means responsive to light passing through the encoder disc is mounted on the base for providing an output signal corresponding to the rotational position of the shaft.

3 Claims, 3 Drawing Figures

ENCODER ASSEMBLY

BACKGROUND OF THE INVENTION

This invention pertains generally to shaft encoders and more particularly to an encoder and pinion assembly which can be mounted on a dial type scale in place of the shaft and pinion of the scale.

Heretofore, shaft angle encoders have been employed with dial type scales to provide electrical signals corresponding to the readings of the scales. One such encoder is described in co-pending application Ser. No. 655,014, filed Feb. 4, 1976.

In order to utilize a shaft angle encoder with an existing scale, it is generally necessary to make some modification to the scale structure to accommodate the encoder. This modification generally involves making a connection to the shaft on which the dial pointer is mounted and frequently requires drilling and tapping into the scale frame to mount portions of the encoder. Such modifications must be done carefully and accurately to assure proper operation of the encoder and to avoid interference with the normal operation of the scale.

SUMMARY AND OBJECTS OF THE INVENTION

The invention provides an encoder assembly which can be mounted quickly and easily without the need for critical alignment. The assembly includes a pinion and shaft which are mounted in a bearing on a base an replace the pinion and shaft of the scale. The bearing is mounted in place of one of the bearings of the scale, and the assembly is secured in place by the set screw which normally holds the scale bearing.

It is in general an object of the invention to provide a new and improved encoder assembly for use with dial scales.

Another object of the invention is to provide an encoder assembly of the above character which can be installed quickly and easily with no critical adjustments.

Additional objects and features of the invention will be apparent from the following description in which the preferred embodiment is set forth in detail in conjunction with the accompanying drawings.

DESCRIPTION OF THE PREFERRED EMBODIMENT

Figure 1:
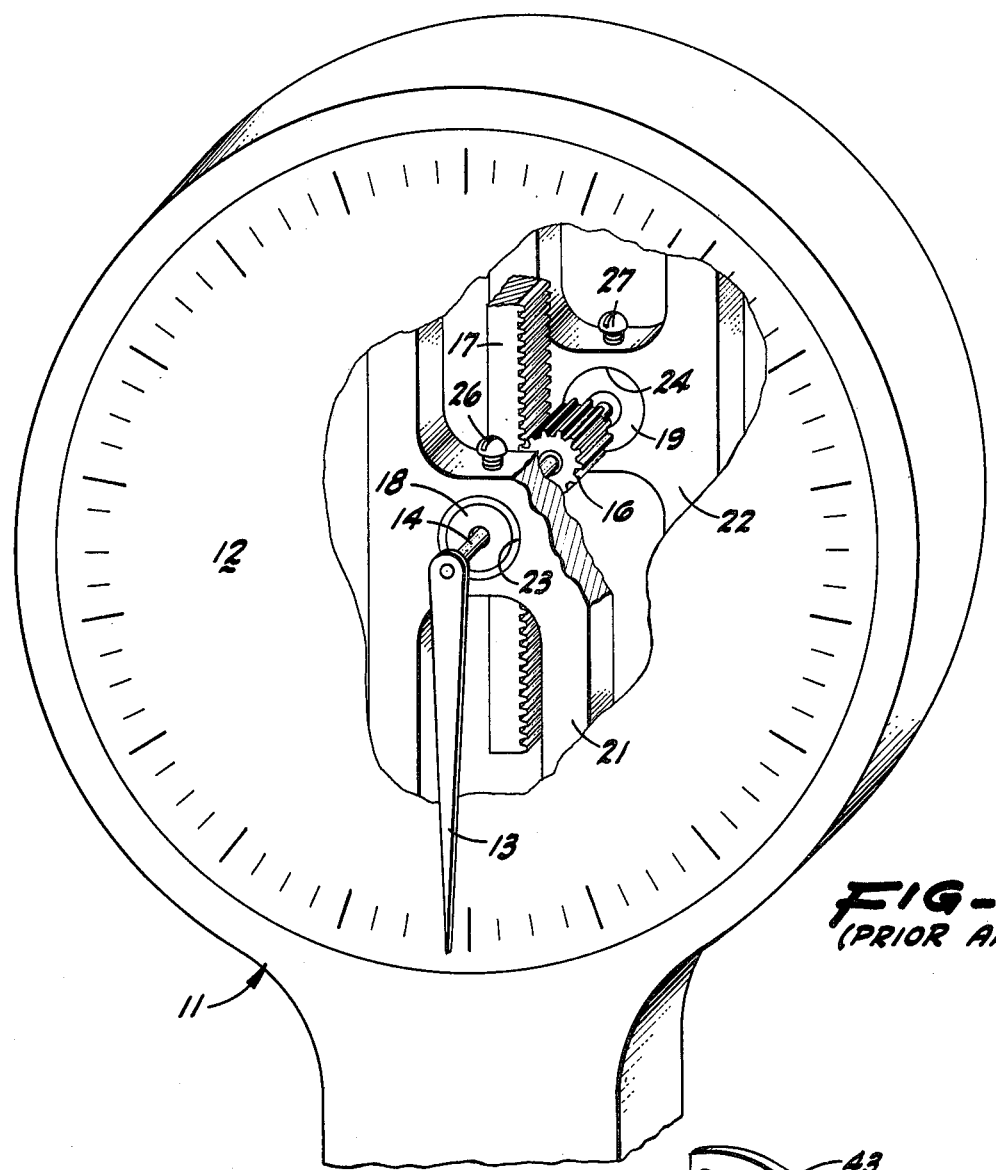
FIG. 1 is a fragmentary perspective view, partly broken away, of a conventional dial type scale with which the invention can be employed.

The scale illustrated in FIG. 1 includes a dial head 11 with a dial 12 and an indicator or pointer 13. The pointer is affixed to shaft 14 on which a pinion 16 is mounted. The pinion is driven by a rack gear 17 in accordance with the weight on the scale. The shaft is rotatively mounted in bearings 18, 19 carried by spaced apart frame members 21, 22. The bearings are mounted in aligned bores 23, 24 in the frame members and secured by set screws 26, 27.

Figure 2:
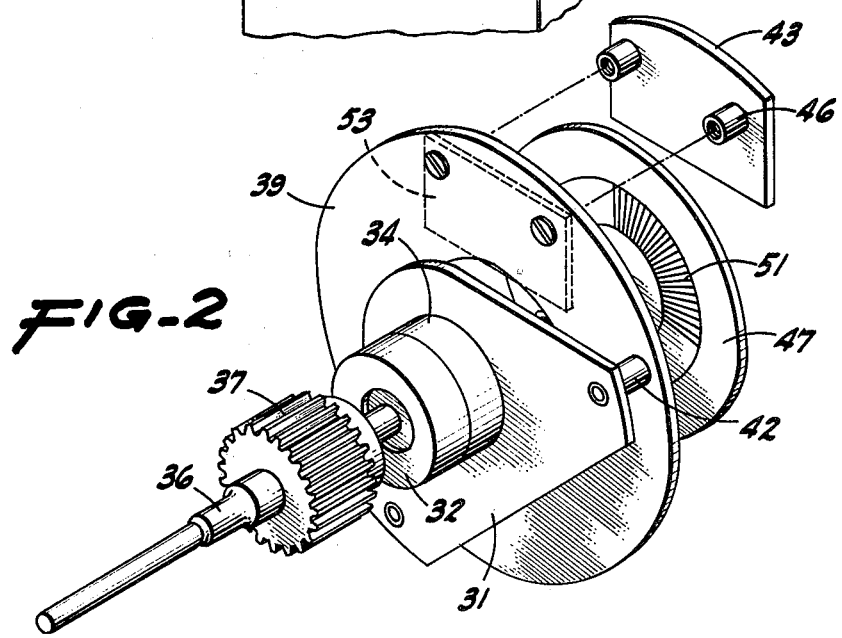
FIG. 2 is an exploded prospective view of one embodiment of an encoder assembly according to the invention.
Figure 3:
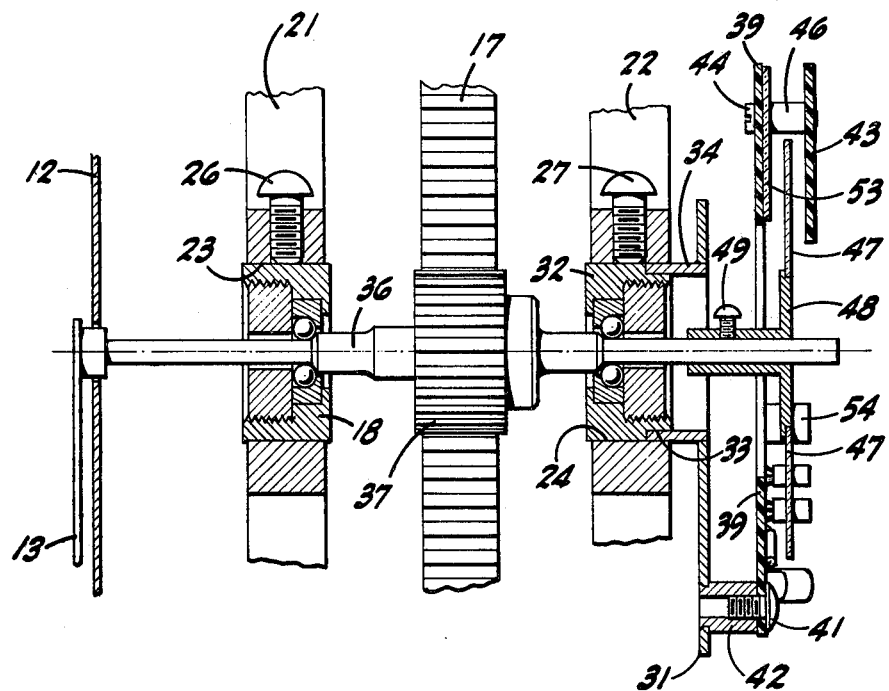
FIG. 3 is a vertical sectional view showing the encoder assembly of FIG. 2 installed in the scale of FIG. 1.

Referring now to FIGS. 2 and 3, the encoder assembly comprises a generally planar sector shaped base 31 on which the bearing 32 is mounted. This bearing has the same outside diameter as bearing 19 and is adapted to be received in bore 24 in place of bearing 19. In the embodiment illustrated, bearing 32 is similar to bearing 19, but one end of the outer housing of the bearing is turned down to form a shoulder 33 which is received in one end of a sleeve 34. The other end of sleeve 34 is affixed to the base.

A shaft 36 carrying pinion 37 is rotatively mounted in bearing 32, and in the embodiment illustrated, the pinion and shaft are identical to the pinion and shaft of the scale. When the encoder assembly is installed in the scale, shaft 36 is also received in bearing 18 of the scale.

An annular circuit board 39 is mounted on base 31 and positioned coaxially of shaft 36. The circuit board is secured to the base by screws 41 and spacers 42. A second circuit board 43 is spaced from and parallel to circuit board 39. This board is mounted on board 39 by screws 44 and spacers 46.

An encoder disc 47 is mounted on shaft 36 and positioned between circuit boards 39, 43. The disc includes a central hub 48 with a set screw 49 by which the disc is affixed to the shaft. In the embodiment illustrated, the encoder is of the type disclosed in the aforesaid application Ser. No. 655,014, and disc 47 includes uniformly spaced radially extending opaque lines arranged in an annular tract 51 toward the periphery of the disc, with light transmissive areas between the opaque lines. A mask 53 having corresponding lines and transmissive areas is mounted on circuit board 39 in radial alignment with the track of lines and transmissive areas on the disc. The lines on the mask are arranged in two groups which are displaced from each other by a distance corresponding to an odd multiple of one-half of the spacing between the lines. The lines in each group are aligned alternately with the lines on the disc when the disc rotates. Light sources and sensors (not shown) are mounted on the circuit boards and produce pulsating signals having a phase relationship corresponding to the direction of disc rotation. The signals are processed by circuitry including components 54 mounted on circuit board 39 to provide an output signal corresonding to the direction and amount of shaft rotation.

Operation and use of the encoder assembly are as follows. The entire assembly is assembled as the unit prior to installation in the scale. The circuit boards and mask are mounted on base 31, and encoder disc 47 is positioned between the boards as illustrated. Shaft 36 is inserted through bearing 32 into the hub portion of the disc and secured by set screw 49.

To install the encoder assembly in the scale, dial pointer 13 is removed, set screws 26 and 27 are loosened, and shaft 14, pinion 16 and bearing 19 are withdrawn rearwardly through bore 24. The encoder assembly is then installed through bore 24, with shaft 36 being received in bearing 18 and bearing 32 being received in bore 24. Bearing 32 is positioned to provide the desired thrust on the shaft, and screw 27 is tightened to retain the assembly in the scale. Pointer 13 is installed on the front end of shaft 36, and leads (not shown) from the encoder assembly are connected to a power source and suitable circuitry for receiving the output signals from the encoder.

The invention has a number of important features and advantages. The encoder is fully assembled prior to installation in the scale, and all critical adjustments can be made at this time. For example, mask 53 can be accurately positioned so that its markings are exactly concentric to shaft 36, and disc 47 can be positioned to provide the proper phase relationship with pinion 37. The entire assembly is retained in the scale by a single set screw, and no drilling or tapping of the scale frame is necessary. Since the shaft and encoder elements are installed as a unit, no adjustment is required in the scale.

It is apparent from the foregoing that a new and improved encoder assembly has been provided. While only one presently preferred embodiment has been described, as will be apparent to those familiar with the art, certain changes and modification can be made without departing from the scope of the invention as defined by the following claims.

What is claimed is:

1. In an encoder assembly for use with a scale having a pinion and shaft rotatively mounted in bearings in spaced apart mounts: a base, a bearing mounted on the base and adapted to be received in one of the mounts in place of a first one of the scale bearings, a pinion and shaft rotatively mounted in the encoder bearing and adapted to be received in a second one of the scale bearings in place of the pinion and shaft of the scale, and encoder means carried by the base for providing an output signal corresponding to the rotational position of the encoder shaft.

2. The assembly of claim 1 wherein the encoder means comprises an optical encoder having a disc with opaque areas and light transmissive areas mounted on the shaft, and means mounted on the base responsive to light passing through the disc.

3. In an encoder assembly for use with a scale in place of a pinion and shaft rotatively mounted in bearings in spaced apart mounts: a generally planar base, a bearing mounted on the base and projecting from one surface thereof, said bearing being adapted for being received in one of the mounts in place of a first one of the scale bearings, a pinion and shaft rotatively mounted in the encoder bearing and extending therefrom to be received in a second one of the scale bearings in place of the pinion and shaft of the scale when the encoder bearing is mounted in the mount for the first bearing, an encoder disc mounted on the shaft and having a plurality of radially extending opaque lines with light transmissive lines therebetween, a mask carried by the base with alternate radially extending opaque lines and light transmissive areas, the lines on the mask being positioned coaxially of the lines on the disc, and means carried by the base responsive to light passing through the disc and mask for providing an output signal corresponding to the rotational position of the shaft.

* * * * *